(12) United States Patent
Ryono et al.

(10) Patent No.: US 12,724,201 B2
(45) Date of Patent: Sep. 1, 2026

(54) FUSION SPLICER

(71) Applicant: Sumitomo Electric Optifrontier Co., Ltd., Yokohama (JP)

(72) Inventors: Yuta Ryono, Yokohama (JP); Ryosuke Meo, Yokohama (JP); Takahiro Suwa, Yokohama (JP); Yoshiyuki Nishizawa, Yokohama (JP); Ryuichiro Sato, Yokohama (JP)

(73) Assignee: Sumitomo Electric Optifrontier Co., Ltd., Yokohama (JP)

( * ) Notice: Subject to any disclaimer, the term of this patent is extended or adjusted under 35 U.S.C. 154(b) by 273 days.

(21) Appl. No.: 18/717,464

(22) PCT Filed: Dec. 19, 2022

(86) PCT No.: PCT/JP2022/046683
§ 371 (c)(1),
(2) Date: Jun. 7, 2024

(87) PCT Pub. No.: WO2023/120480
PCT Pub. Date: Jun. 29, 2023

(65) Prior Publication Data

US 2025/0044513 A1 Feb. 6, 2025

(30) Foreign Application Priority Data

Dec. 21, 2021 (JP) ................................ 2021-206959

(51) Int. Cl.
*G02B 6/255* (2006.01)

(52) U.S. Cl.
CPC ................................ *G02B 6/2555* (2013.01)

(58) Field of Classification Search
CPC ... G02B 6/2555; G02B 6/2553; G02B 6/2551
USPC ..................................................... 385/96, 97
See application file for complete search history.

(56) References Cited

U.S. PATENT DOCUMENTS

| | | | | |
|---|---|---|---|---|
| 4,725,297 | A | 2/1988 | Grigsby et al. | |
| 2002/0009271 | A1 | 1/2002 | Herve et al. | |
| 2012/0141085 | A1* | 6/2012 | Aoki .................... | G02B 6/2555 385/136 |
| 2014/0131326 | A1 | 5/2014 | Sato et al. | |
| 2015/0049991 | A1 | 2/2015 | Kawanishi | |

FOREIGN PATENT DOCUMENTS

| | | | |
|---|---|---|---|
| JP | S62-27211 | A | 11/1987 |
| JP | S62-272211 | A | 11/1987 |
| JP | H1-285903 | A | 11/1989 |
| JP | H5-224023 | A | 9/1993 |
| JP | H6-258541 | A | 9/1994 |
| JP | H6-285841 | A | 9/1994 |

(Continued)

*Primary Examiner* — Robert Tavlykaev
(74) *Attorney, Agent, or Firm* — McDonald Hopkins LLC

(57) ABSTRACT

A fusion splicer according to one embodiment includes a pedestal including a plurality of V-grooves that position a plurality of respective optical fibers; and a plurality of clamps for pressing the plurality of optical fibers placed in the plurality of respective V-grooves. The plurality of clamps are arranged along the arrangement direction of the plurality of optical fibers. Each of the plurality of clamps is configured to press the optical fibers corresponding to each clamp.

18 Claims, 7 Drawing Sheets

(56) References Cited

FOREIGN PATENT DOCUMENTS

| | | | | |
|---|---|---|---|---|
| JP | H6-347660 | A | 12/1994 | |
| JP | H8-146243 | A | 6/1996 | |
| JP | H9-090152 | A | 4/1997 | |
| JP | 2002-286964 | A | 10/2002 | |
| JP | 2011-158728 | A | 8/2011 | |
| JP | 2012-230201 | A | 11/2012 | |
| JP | 2013-015623 | A | 1/2013 | |
| JP | 2013-037136 | A | 2/2013 | |
| WO | WO 03038500 | A2 * | 5/2003 | ........... G02B 6/2551 |
| WO | 2013/005640 | A1 | 1/2013 | |
| WO | 2013/145474 | A1 | 10/2013 | |

* cited by examiner

Z
Y
X
51
52
50
55
54
40b
20h
33
30
12
11
32
31
34
35
13
20d
20(21)
20(22)
33
30

FUSION SPLICER

TECHNICAL FIELD

The present disclosure relates to a fusion splicer.

Priority is claimed on Japanese Patent Application No. 2021-206959, filed on Dec. 21, 2021, the entire content of which is incorporated herein by reference.

BACKGROUND ART

Patent Literature 1 describes an optical fiber fusion machine. The optical fiber fusion machine includes a base including a plurality of fiber grooves that accommodate optical fibers, and a fiber clamp member that presses the optical fibers accommodated in the fiber grooves. The fiber clamp member includes a clamp block. A fiber clamp that presses the optical fibers is coupled to the clamp block via a clamp auxiliary body. The clamp block is movable in an up-down direction with respect to the fiber clamp. A clamp spring is provided between the clamp block and the clamp auxiliary body. The pressing load of the optical fibers by the fiber clamp changes depending on the height position of the clamp block.

Patent literature 2 describes a fusion splicer that fusion-splices a pair of optical fibers. The fusion splicer includes a fiber holder that holds the optical fibers; a groove-formed substrate on which tip parts of the optical fibers are placed; and a fiber clamp member that presses the optical fibers placed on the groove-formed substrate.

CITATION LIST

Patent Literature

Patent Literature 1: Japanese Unexamined Patent Publication No. 2013-15623

Patent Literature 2: International Publication WO 2013/145474

SUMMARY OF INVENTION

A fusion splicer according to the present disclosure includes a pedestal including a plurality of V-grooves that position a plurality of respective optical fibers; and a plurality of clamps for pressing the plurality of optical fibers placed in the plurality of respective V-grooves. The plurality of clamps are arranged along an arrangement direction of the plurality of optical fibers. Each of the plurality of clamps is configured to press the optical fibers corresponding to each clamp.

DESCRIPTION OF EMBODIMENTS

Figure 1:
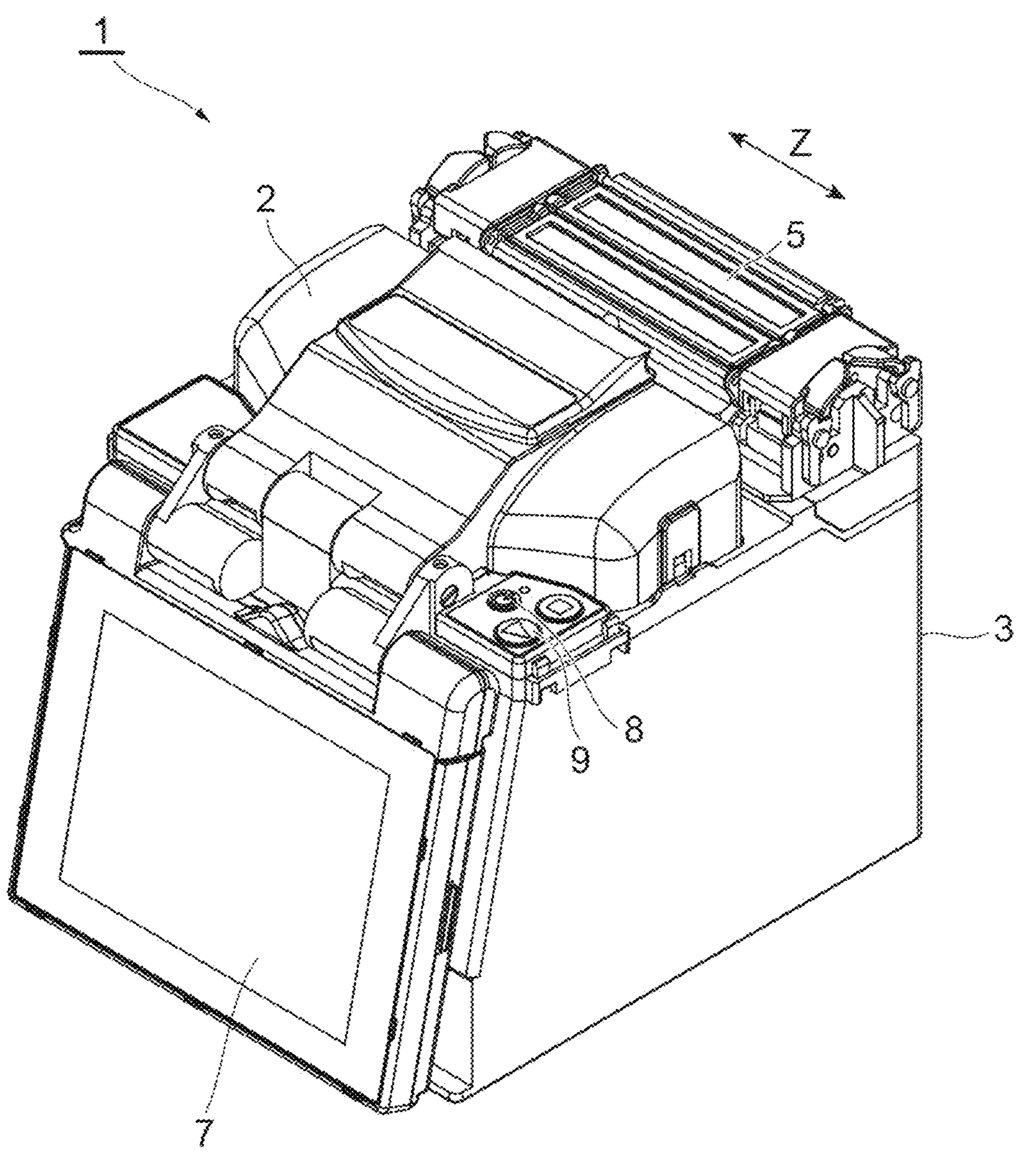
FIG. 1 is a perspective view showing a fusion splicer according to an embodiment.

Particularly, in recent years, various forms of optical fibers such as a flat ribbon cable or an intermittent ribbon fiber may be fusion-spliced. However, depending on the form of optical fibers, axial misalignment may individually occur when the optical fibers are placed in V-grooves that position the optical fibers. Debris generated when the coatings of the optical fibers are removed, dust that has entered from the outside, or the like may adhere to the optical fibers placed in the V-grooves. Axial misalignment of the optical fibers may occur due to the adhesion of debris, dust, or the like.

An object of the present disclosure is to provide a fusion splicer capable of suppressing axial misalignment.

DESCRIPTION OF EMBODIMENT OF PRESENT INVENTION

Initially, the contents of an embodiment of the present disclosure will be listed and described. (1) A fusion splicer according to one embodiment includes a pedestal including a plurality of V-grooves that position a plurality of respective optical fibers; and a plurality of clamps for pressing the plurality of optical fibers placed in the plurality of respective V-grooves. The plurality of clamps are arranged along an arrangement direction of the plurality of optical fibers. Each of the plurality of clamps is configured to press the optical fibers corresponding to each clamp.

The fusion splicer includes the pedestal on which the V-grooves are formed, and the plurality of clamps that press the plurality of respective optical fibers placed in the V-grooves. The plurality of clamps are arranged along the arrangement direction of the plurality of optical fibers. Each of the plurality of clamps is configured to press the optical fibers corresponding to each clamp. Since each of the plurality of clamps individually presses the optical fibers, pressing according to each the optical fiber can be performed. Namely, the influence of pressing the optical fibers by a clamp can be made less likely to affect other optical fibers pressed by other clamps. Even when there is debris or dust on the pedestal, the debris or dust can be made less likely to affect the plurality of optical fibers, so that appropriate pressing of the plurality of optical fibers can be realized. Therefore, axial misalignment of the optical fibers can be suppressed.

(2) In (1) described above, the fusion splicer may include a guide portion that guides the plurality of clamps into the plurality of V-grooves. In this case, since the plurality of clamps are guided into the V-grooves by the guide portion, the plurality of clamps can be stably operated. Therefore, more appropriate pressing of the plurality of optical fibers can be realized.

(3) In (2) described above, the fusion splicer may include the guide portion on the pedestal on which the V-grooves are formed. In this case, since the guide portion and the V-grooves are provided on the same pedestal, the plurality of clamps can be stably operated. Therefore, more appropriate pressing of the plurality of optical fibers can be realized.

(4) In (2) described above, the fusion splicer may include a support member that supports the plurality of clamps. The support member may include the guide portion. In this case, since the support member includes the guide portion, the guide portion can be easily formed. As a result, an increase in cost involved in manufacturing the guide portion can be suppressed.

(5) In any of (1) to (4) described above, the plurality of clamps may be movable independently of each other.

(6) In any of (1) to (5) described above, the clamps may be made of a low friction material.

(7) In any of (1) to (6) described above, the clamps may be made of zirconia.

(8) In any of (1) to (7) described above, the plurality of clamps may include a pair of first clamps that press the optical fibers located at both ends in the arrangement direction among the plurality of optical fibers, and a second clamp located between the pair of first clamps.

(9) In (8) described above, the plurality of clamps may include two first clamps and one second clamp.

(10) In any of (1) to (9) described above, a gap may be formed between two clamps.

(11) In (4) described above, the support member may be made of resin.

(12) In (4) or (11) described above, the support member may support the clamps so as to be rotatable with respect to the support member.

(13) In (4) or (12) described above, the support member may include shaft portions extending along a direction in which the optical fibers extend, and the plurality of clamps may be individually rotatable about the respective shaft portions.

(14) In any of (1) to (13) described above, the clamps may have a U shape when viewed along the arrangement direction of the plurality of optical fibers.

(15) In (13) described above, each clamp may include a first part to which one end of the shaft portion is connected, a second part to which the other end of the shaft portion is connected, and a pressing portion connecting the first part and the second part to each other.

(16) In (15) described above, each of the first part, the second part, and the pressing portion may have a block shape.

(17) In (15) or (16) described above, the pressing portion may extend below the shaft portion along the direction in which the optical fibers extend.

(18) In (3) described above, the guide portion may protrude from a main surface of the pedestal.

(19) In (3) or (18) described above, the fusion splicer may include a pair of the guide portions on the pedestal, the pair of guide portions being arranged along the arrangement direction of the plurality of optical fibers.

(20) In (4) described above, the support member may include a support portion that is inserted into the clamp and that rotatably supports the clamp, and a head portion provided above the support portion, and the guide portion may extend downward from the head portion of the support member.

Details of Embodiment of Present Invention

A specific example of a fusion splicer according to an embodiment of the present disclosure will be described. In the description of the drawings, the same or corresponding elements are denoted by the same reference signs, and duplicate descriptions will be omitted as appropriate. For ease of understanding, the drawings may be depicted in a partially simplified or exaggerated manner, and dimensional ratios and the like are not limited to those shown in the drawings.

Figure 2:
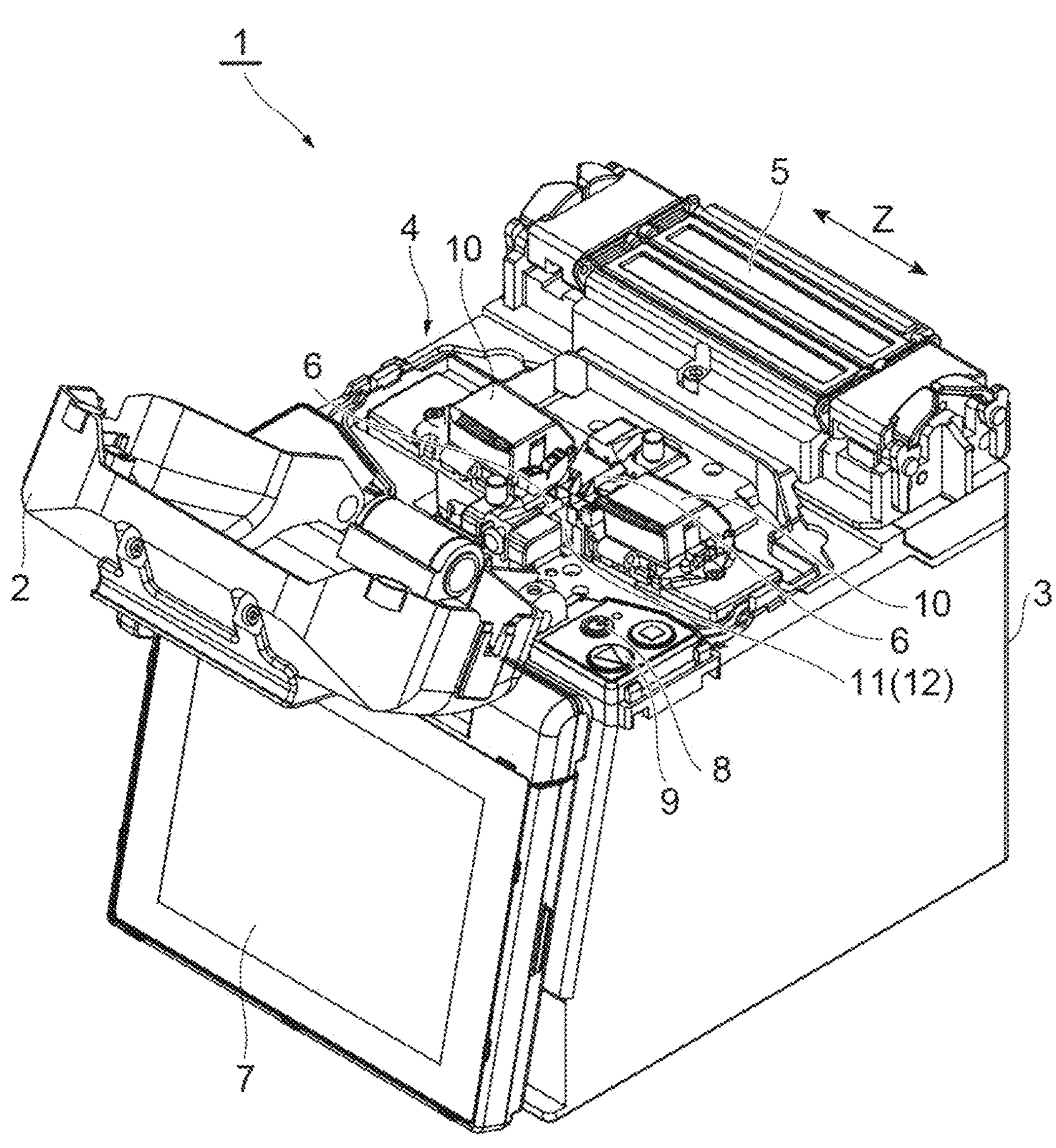
FIG. 2 is a perspective view showing an internal structure of the fusion splicer of FIG. 1.

FIG. 1 is a perspective view showing a fusion splicer 1 according to an embodiment. The fusion splicer 1 includes a windshield cover 2 at an upper portion thereof. FIG. 2 is a perspective view schematically showing a state where the windshield cover 2 of the fusion splicer 1 is opened. As shown in FIGS. 1 and 2, the fusion splicer 1 includes a housing 3 having a box shape. A fusion splicing unit 4 that fuses optical fibers and a heater 5 that heats and shrinks fiber reinforcing sleeves with which splicing portions of the optical fibers fused in the fusion splicing unit 4 are covered are provided at an upper portion of the housing 3. The fusion splicer 1 includes a monitor 7 that displays an image of the state of fusion splicing of the optical fibers captured by a microscope (not shown) disposed inside the housing 3. Furthermore, the fusion splicer 1 includes an electric power switch 8 that turns on and off electric power of the fusion splicer 1, and a splicing start switch 9 for performing fusion splicing of the optical fibers.

The fusion splicing unit 4 includes a pair of discharge electrodes 6 that fusion-splice a plurality of the optical fibers, and a pair of optical fiber holders 10 that hold the plurality of optical fibers. For example, in the fusion splicer 1, 12 optical fibers are fusion-spliced to 12 other optical fibers. The pair of discharge electrodes 6 fuse the plurality of optical fibers to each other through electric discharge. The discharge electrodes 6 and the optical fiber holders 10 are arranged in order along a Z-axis direction. The Z-axis direction is a direction in which each of the plurality of optical fibers that are targets to be fusion-spliced extends.

Figure 3:
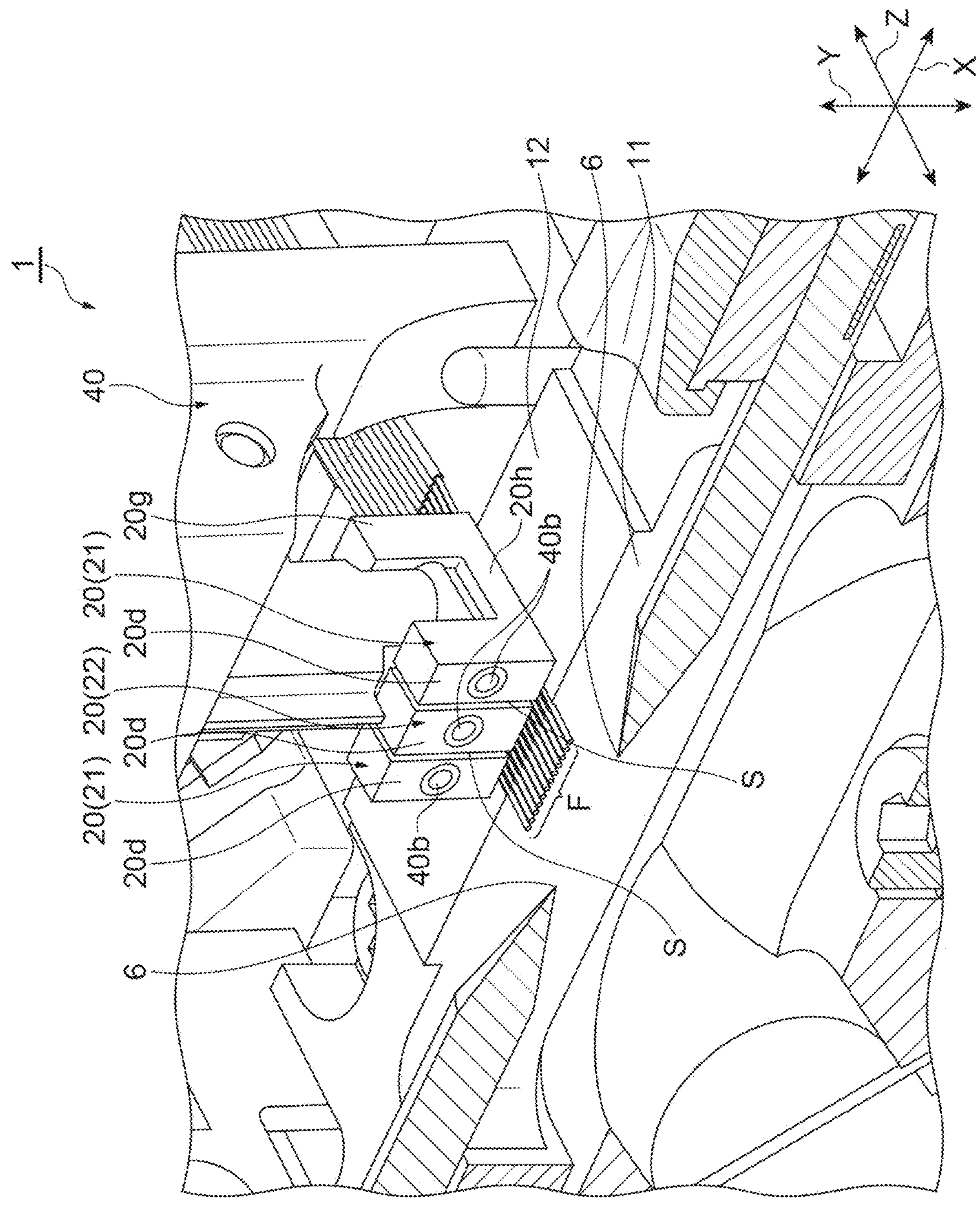
FIG. 3 is a cross-sectional perspective view showing a pedestal, a clamp, and optical fibers of the fusion splicer of FIG. 1.

FIG. 3 is a cross-sectional perspective view showing a periphery of the discharge electrodes 6 in the fusion splicer 1. As shown in FIGS. 2 and 3, the fusion splicer 1 includes a pedestal 11 on which a plurality of optical fibers F to be fusion-spliced are placed, and a clamp 20 that presses the optical fibers F placed on the pedestal 11. The pedestal 11 has a main surface 12 on which the plurality of optical fibers F are placed. The plurality of optical fibers F on the main surface 12 are arranged along an X-axis direction intersecting the Z-axis direction. For example, the X-axis direction is an in-plane direction of the main surface 12, and is a direction orthogonal to the Z-axis direction. The pair of discharge electrodes 6 are disposed on both sides in the X-axis direction when viewed from the plurality of optical fibers F.

Figure 4:
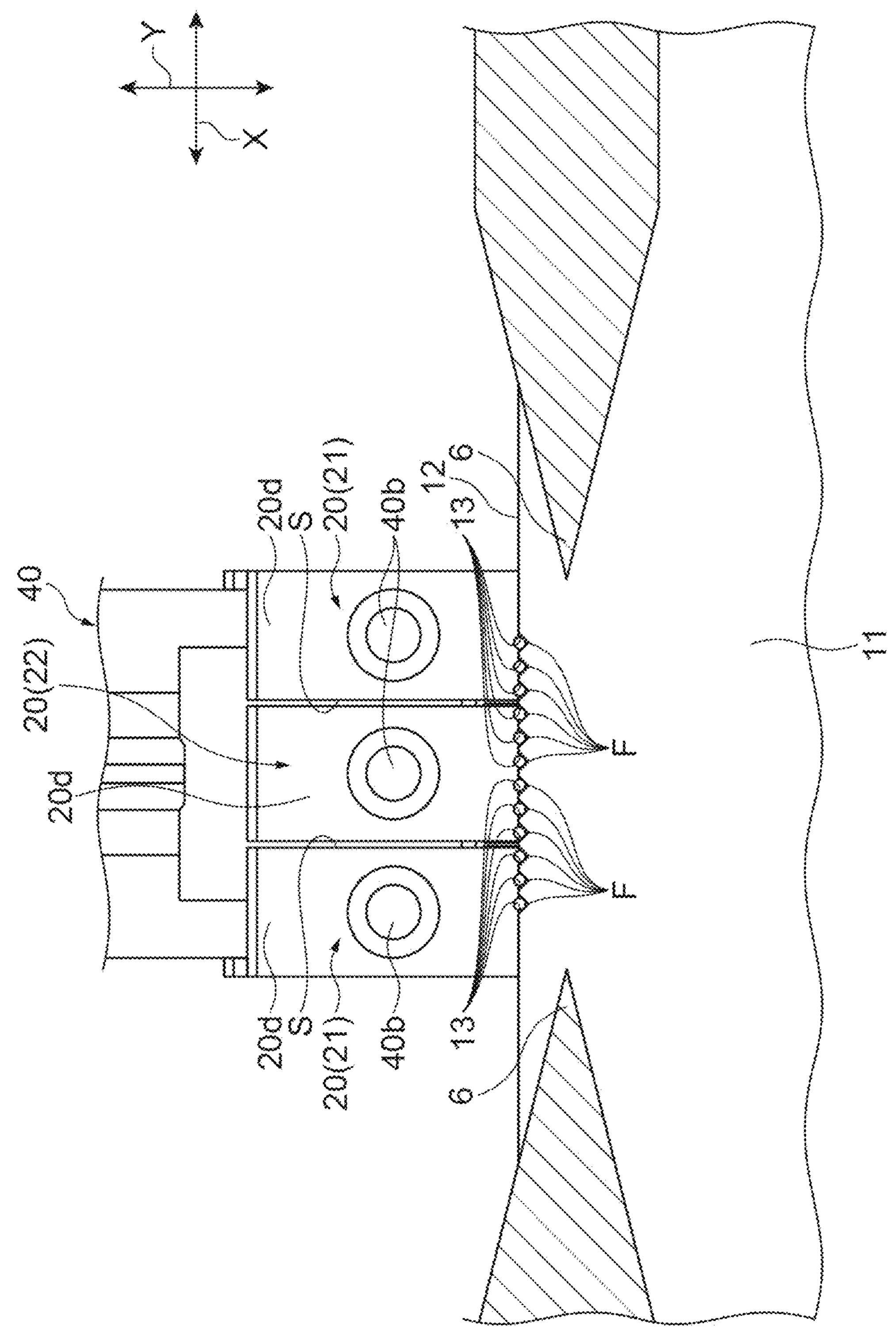
FIG. 4 is a cross-sectional view showing the pedestal, the clamp, and the optical fibers cut along a plane orthogonal to an extending direction of the optical fibers.

FIG. 4 is an enlarged cross-sectional view of the pair of discharge electrodes 6, the pedestal 11, the clamp 20, and the optical fibers F. As shown in FIGS. 3 and 4, the pedestal 11 has a plurality of V-grooves 13, into which the optical fibers F are inserted, on the main surface 12. The fusion splicer 1 includes a plurality of the clamps 20, and the plurality of clamps 20 are arranged along the X-axis direction that is an arrangement direction of the plurality of optical fibers F. For example, the clamps 20 are made of a low friction material. As one example, the clamps 20 are made from zirconia. In this case, even when the plurality of clamps 20 come into contact with each other, the slidability of the clamps 20 can be ensured.

For example, the plurality of clamps 20 include a pair of first clamps 21 that press the optical fibers F located at both ends in the X-axis direction among the plurality of optical fibers F, and a second clamp 22 located between the pair of first clamps 21. As one example, the plurality of clamps 20 include two first clamps 21 and one second clamp 22. For example, each first clamp 21 presses three optical fibers F, and one second clamp 22 presses six optical fibers F. For example, a gap S is formed between two clamps 20 arranged adjacent to each other along the X-axis direction, and the plurality of clamps 20 are movable independently of each other in the X, Y, and Z directions (the X-axis direction, a Y-axis direction, and the Z-axis direction).

The fusion splicer 1 includes a support member 40 that supports the plurality of clamps 20. As one example, the support member 40 is made of resin. The support member 40 supports the clamps 20 so as to be rotatable with respect to the support member 40. The support member 40 includes shaft portions 40*b* extending along the Z-axis direction that is a direction in which the optical fibers F extend, and the clamps 20 are individually rotatable about the respective shaft portions 40*b*. For example, when viewed along the X-axis direction that is the arrangement direction of the plurality of optical fibers F, and that is an arrangement direction of the plurality of clamps 20, the clamps 20 have a U shape.

For example, the clamp 20 includes a first part 20*d* to which one end of the shaft portion 40*b* is connected; a second part 20*g* to which the other end of the shaft portion 40*b* is connected; and a pressing portion 20*h* connecting the first part 20*d* and the second part 20*g* to each other. Each of the first part 20*d*, the second part 20*g*, and the pressing portion 20*h* has, for example, a block shape. The pressing portion 20*h* extends below the shaft portion 40*b* along the Z-axis direction.

Figure 5:
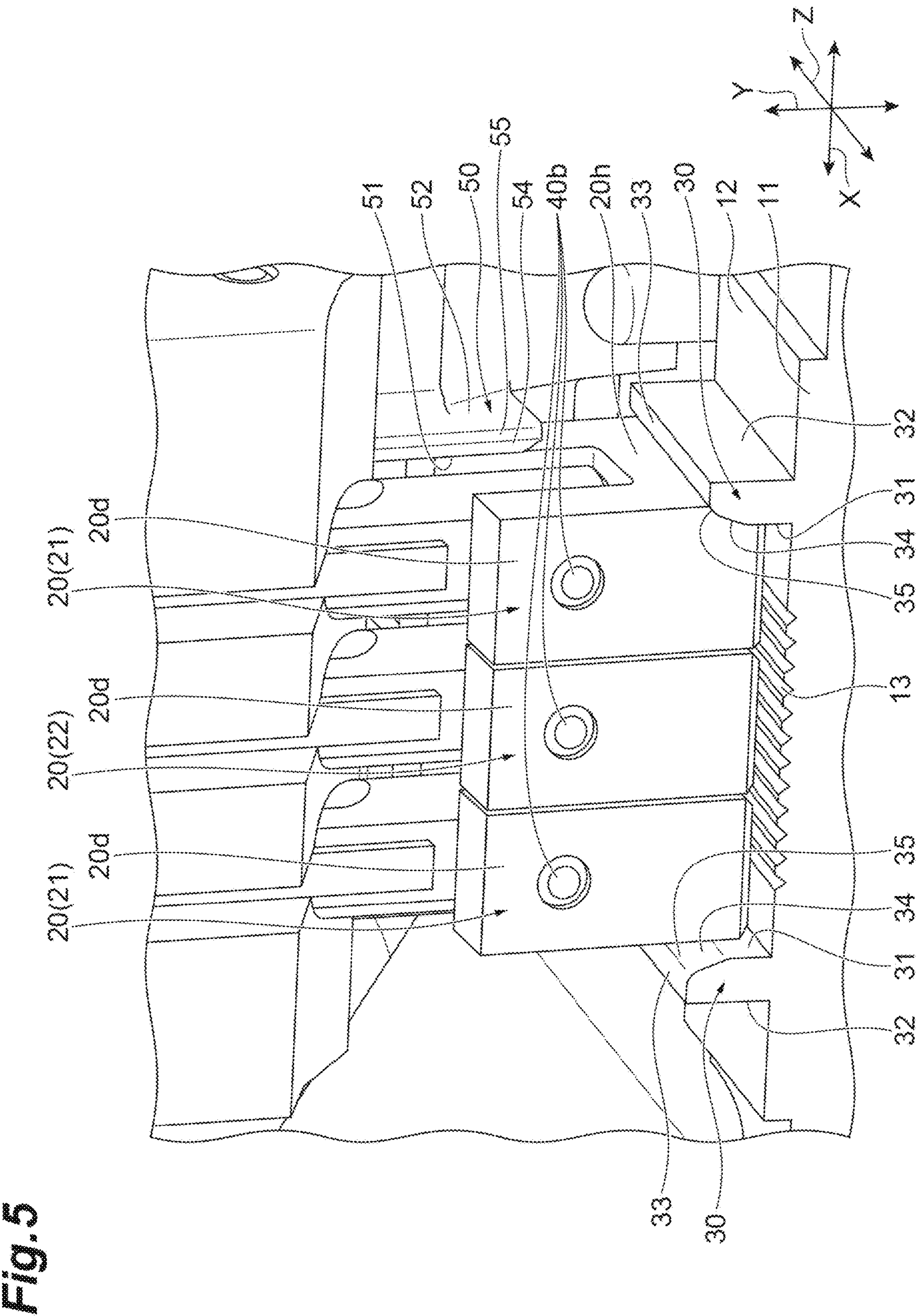
FIG. 5 is a perspective view showing a guide portion provided in the pedestal.

For example, the fusion splicer 1 may include a guide portion 30 that guides the clamp 20. FIG. 5 is a perspective view showing an example of the pedestal 11 including the guide portion 30. As shown in FIG. 5, the guide portion 30 protrudes from the main surface 12 of the pedestal 11. The guide portion 30 is provided to guide the movement of the clamp 20 in the Y-axis direction. The Y-axis direction is a direction intersecting both the Z-axis direction and the X-axis direction, and is a direction in which the clamps 20 press the optical fibers F. For example, the fusion splicer 1 includes a pair of the guide portions 30 arranged along the X-axis direction on the pedestal 11, and each guide portion 30 is located on a side opposite to the second clamp 22 when viewed from the first clamp 21. In this case, each clamp 20 moves along the Y-axis direction in a state where each clamp 20 is inserted between the pair of guide portions 30. The first clamp 21 and the second clamp 22 move toward the V-grooves 13 and the plurality of optical fibers F in a state where the rotatable range of the first clamp 21 and the rotatable range of the second clamp 22 are limited to a specific range by the guide portion 30 and the second clamp 22 and by the first clamps 21, respectively.

As one example, the guide portion 30 has an inner surface 31 facing the second clamp 22; an outer surface 32 facing a side opposite to the inner surface 31; and a top surface 33 located at an upper end of the outer surface 32. Furthermore, the guide portion 30 has an inclined surface 34 extending from an upper end of the inner surface 31 in a direction inclined with respect to both the X-axis direction and the Y-axis direction, and a curved surface 35 that curves to bulge outward from the guide portion 30 between the top surface 33 and the inclined surface 34.

Figure 6:
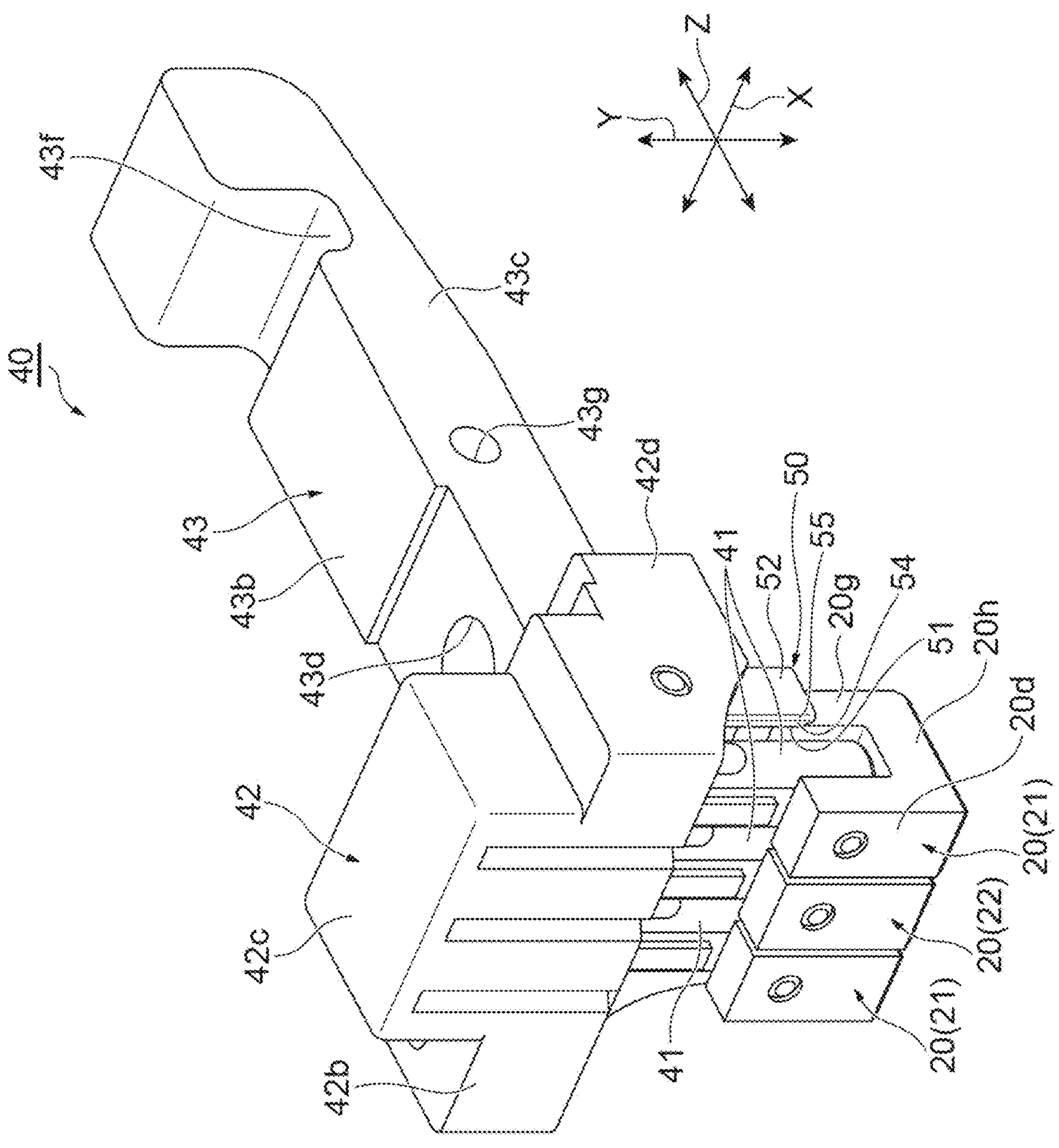
FIG. 6 is a perspective view showing a support member that supports the clamp.

FIG. 6 is a perspective view showing the support member 40. As shown in FIGS. 5 and 6, the support member 40 includes, for example, a support portion 41 that is inserted into the clamp 20 and that rotatably supports the clamp 20; a head portion 42 provided above the support portion 41; and an arm portion 43 extending from the head portion 42 along the Z-axis direction. The support member 40 includes a plurality of the support portions 41, and for example, the number of the support portions 41 is the same as the number of the clamps 20. The support portions 41 have, for example, a rod shape extending in the Y-axis direction.

The head portion 42 includes a main body portion 42*b* located at upper portions of the support portions 41; a first protruding portion 42*c* protruding upward from the main body portion 42*b*; and a second protruding portion 42*d* protruding from the main body portion 42*b* toward the arm portion 43. The arm portion 43 has an upper surface 43*b* extending in both the Z-axis direction and the X-axis direction, and a side surface 43*c* extending in both the Y-axis direction and the Z-axis direction. The arm portion 43 has a first hole 43*d* recessed from the upper surface 43*b*; a recess 43*f* located on a side opposite to the head portion 42 when viewed from the first hole 43*d*; and a second hole 43*g* recessed from the side surface 43*c*. The recess 43*f* is formed on the upper surface 43*b*, and extends along the X-axis direction on the upper surface 43*b*.

The fusion splicer 1 includes, for example, a guide portion 50 extending downward from the head portion 42 of the support member 40. The fusion splicer 1 includes a pair of the guide portions 50 arranged along the X-axis direction. The pair of guide portions 50 are provided along both end sides of the plurality of support portions 41 in the X-axis direction. In this case, each clamp 20 moves along the Y-axis direction in a state where each clamp 20 is inserted between the pair of guide portions 50. The first clamp 21 and the second clamp 22 move toward the V-grooves 13 and the plurality of optical fibers F in a state where the rotatable range of the first clamp 21 and the rotatable range of the second clamp 22 are limited to the specific range by the guide portion 50 and the second clamp 22 and by the first clamps 21, respectively. For example, the guide portions 50 have a plate shape. The guide portion 50 has, for example, an inner surface 51 facing the support portion 41, and an outer surface 52 facing a side opposite to the inner surface 51. Furthermore, the guide portion 50 has an inclined surface 54 extending in a direction inclined in both the Z-axis direction and the X-axis direction, and a curved surface 55 that curves to bulge outward from the guide portion 50 between the outer surface 52 and the inclined surface 54.

Next, actions and effects obtained from the fusion splicer 1 according to the present embodiment will be described. The fusion splicer 1 includes the pedestal 11 on which the V-grooves 13 are formed, and the plurality of clamps 20 that press the plurality of optical fibers F placed in the V-grooves 13. The plurality of clamps 20 are arranged along the arrangement direction of the plurality of optical fibers F. The plurality of clamps 20 are independent of each other, and each of the plurality of clamps 20 independent of each other presses different optical fibers F. Since each of the plurality of clamps 20 individually presses the optical fibers F, pressing according to each optical fiber F can be performed.

Namely, the influence of pressing the optical fibers F by a clamp 20 can be made less likely to affect other optical fibers F pressed by other clamps 20. Even when there is debris or dust on the pedestal 11, the debris or dust can be made less likely to affect the plurality of optical fibers F, so that appropriate pressing of the plurality of optical fibers F can be realized. Therefore, axial misalignment of the optical fibers F can be suppressed.

In the case of attempting to press all the plurality of optical fibers with one clamp, for example, when debris or dust is sandwiched between a lower surface of the clamp and the pedestal, a case where a sufficient force cannot be applied to some or all of the optical fibers pressed by the clamp may occur. On the other hand, in the present embodiment, the plurality of optical fibers F are divided into a plurality of groups (for example, 12 optical fibers are divided into groups of 3, 6, and 3), and the optical fibers F are pressed by one clamp 20 for each group. Therefore, even when one clamp 20 cannot satisfactorily press the optical fibers F due to debris or dust, the other clamps 20 different from the one clamp 20 can press the optical fibers F without conditions being changed while pressing conditions (for example, pressing load) of only the one clamp 20 are changed. In such a manner, since the pressing conditions can be changed for each clamp 20, even when there is debris or dust under one clamp 20, the clamps 20 other than the one clamp 20 can press the corresponding optical fibers F without being affected by the debris or dust. As a result, appropriate pressing of the plurality of optical fibers F can be realized. Therefore, the occurrence of axial misalignment of the optical fibers F can be suppressed.

The fusion splicer 1 may include the guide portions 30 that guide the plurality of clamps 20 to the pedestal 11 including the plurality of V-grooves 13. In this case, since the plurality of clamps 20 are guided into the V-grooves 13 by the guide portions 30, the plurality of clamps 20 can be stably operated. Therefore, more appropriate pressing of the plurality of optical fibers F can be realized. The same actions and effects can be obtained from the guide portions 50 provided on the support member 40.

As described above, the fusion splicer 1 may include the support member 40 that supports the plurality of clamps 20, and the support member 40 may include the guide portions 50. In this case, since the support member 40 includes the guide portions 50, the guide portions 50 can be easily formed. As a result, an increase in cost involved in manufacturing the guide portions 50 can be suppressed. For example, when the support member 40 is made of resin, the guide portions 50 can be formed by integral molding of the resin.

The embodiment of the fusion splicer according to the present disclosure has been described above. However, the present invention is not limited to the above-described embodiment, and can be changed as appropriate within the scope of the concept described in the claims. The shape, size, number, material, and disposition mode of each part of the fusion splicer are not limited to those in the above-described embodiment, and can be changed as appropriate. For example, in the above-described embodiment, an example in which the pedestal 11 includes the guide portions 30 and the support member 40 includes the guide portions 50 has been described. However, the fusion splicer may not include at least one of the guide portion 30 and the guide portion 50.

Figure 7:
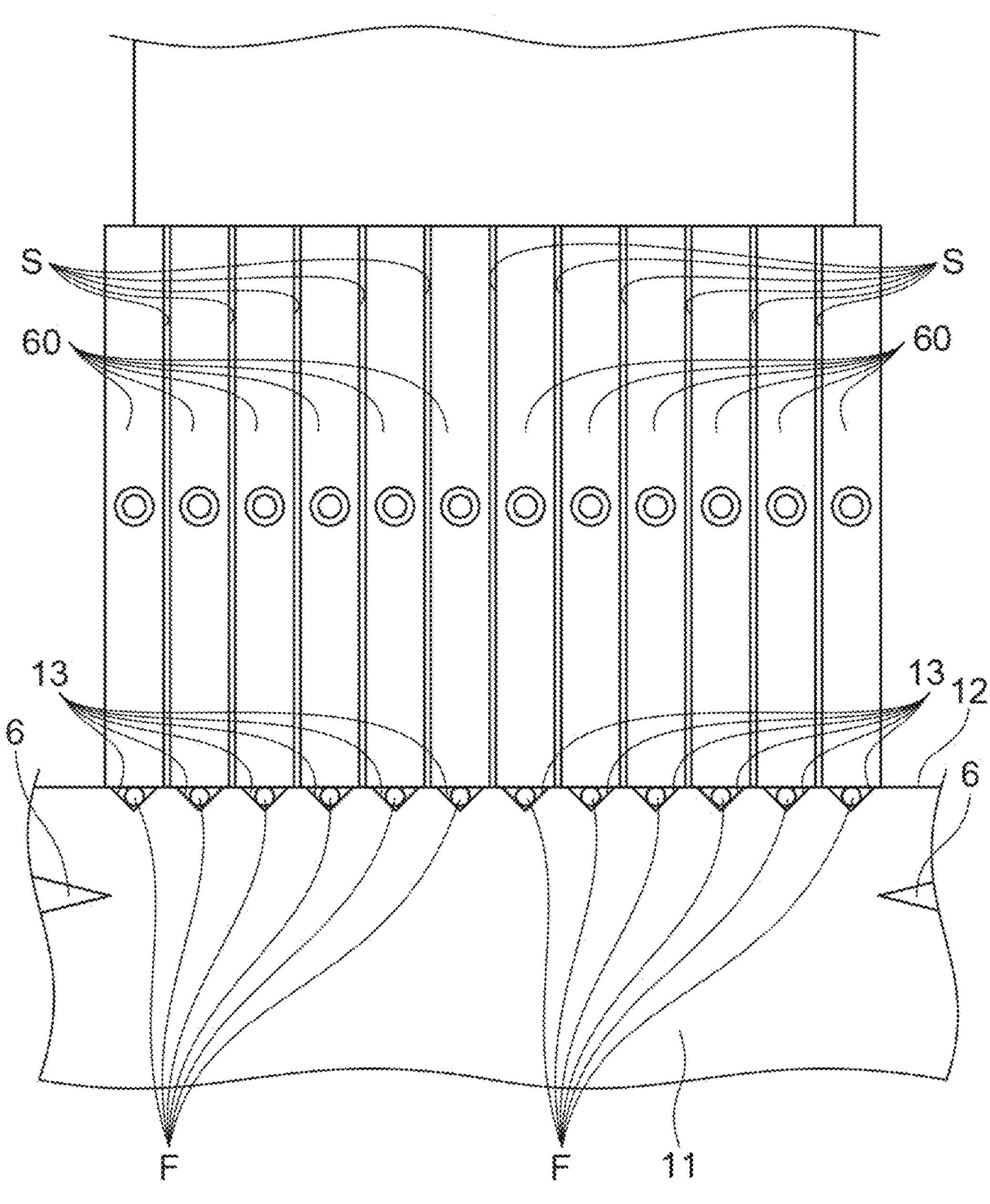
FIG. 7 is a cross-sectional view showing a clamp, a pedestal, and optical fibers according to a modification example.

For example, in the above-described embodiment, an example in which the plurality of clamps 20 include the pair of first clamps 21 and the second clamp 22. Namely, an example in which the number of the clamps is three has been described. However, as shown in FIG. 7, the fusion splicer may include the same number of clamps 60 as the number of the V-grooves 13. Namely, the fusion splicer may include 12 clamps 60. In this case, since each clamp 60 presses each optical fiber F, pressing according to each optical fiber F can be more appropriately performed. Therefore, axial misalignment of the optical fibers F can be more reliably suppressed. Furthermore, the number of the clamps may not be the same as the number of the optical fibers F, but may be two or more and less than or equal to the number of the optical fibers F. In such a manner, the number of the clamps can be changed as appropriate.

REFERENCE SIGNS LIST

1: fusion splicer, 2: windshield cover, 3: housing, 4: fusion splicing unit, 5: heater, 6: discharge electrode, 7: monitor, 8: electric power switch, 9: splicing start switch, 10: optical fiber holder, 11: pedestal, 12: main surface, 13: V-groove, 20: clamp, 20*d*: first part, 20*g*: second part, 20*h*: pressing portion, 21: first clamp, 22: second clamp, 30: guide portion, 31: inner surface, 32: outer surface, 33: top surface, 34: inclined surface, 35: curved surface, 40: support member, 40*b*: shaft portion, 41: support portion, 42: head portion, 42*b*: main body portion, 42*c*: first protruding portion, 42*d*: second protruding portion, 43: arm portion, 43*b*: upper surface, 43*c*: side surface, 43*d*: first hole, 43*f*: recess, 43*g*: second hole, 50: guide portion, 51: inner surface, 52: outer surface, 54: inclined surface, 55: curved surface, 60: clamp, F: optical fiber, S: gap.

What is claimed is:

1. A fusion splicer comprising:

a pedestal including a plurality of V-grooves that position a plurality of respective optical fibers along an arrangement direction that is transverse to longitudinal axes of the plurality of optical fibers; and a plurality of clamps for pressing the plurality of optical fibers placed in the plurality of respective V-grooves, wherein the plurality of clamps are arranged side-by-side along the arrangement direction of the plurality of optical fibers, and each of the plurality of clamps is configured to press the optical fibers corresponding to each clamp, wherein a support member supports the clamps so as to be rotatable with respect to the support member, and wherein the support member includes shaft portions extending along a direction in which the optical fibers extend, and the plurality of clamps are individually rotatable about the respective shaft portions.

2. The fusion splicer according to claim 1, wherein the fusion splicer includes a guide portion that guides the plurality of clamps.

3. The fusion splicer according to claim 2, wherein the pedestal includes the guide portion.

4. The fusion splicer according to claim 3, wherein the guide portion protrudes from a main surface of the pedestal.

5. The fusion splicer according to claim 3, wherein the pedestal includes a pair of the guide portions arranged along the arrangement direction of the plurality of optical fibers.

6. The fusion splicer according to claim 2, wherein the support member includes the guide portion.

7. The fusion splicer according to claim 6, wherein the support member includes a support portion that is inserted into the plurality of clamps and that rotatably supports the plurality of clamps, and a head portion provided above the support portion, and the guide portion extends downward from the head portion of the support member.

8. The fusion splicer according to claim 1, wherein the plurality of clamps are movable independently of each other.

9. The fusion splicer according to claim 1, wherein the plurality of clamps are made of a low friction material.

10. The fusion splicer according to claim 1, wherein the plurality of clamps are made of zirconia.

11. The fusion splicer according to claim 1, wherein the plurality of clamps include a pair of first clamps that press the optical fibers located at both ends in the arrangement direction among the plurality of optical fibers, and a second clamp located between the pair of first clamps.

12. The fusion splicer according to claim 11, wherein the plurality of clamps include two first clamps and one second clamp.

13. The fusion splicer according to claim 1, wherein a gap is formed between two clamps of the plurality of clamps.

14. The fusion splicer according to claim 1, wherein the support member is made of resin.

15. The fusion splicer according to claim 1, wherein the plurality of clamps have a U shape when viewed along the arrangement direction of the plurality of optical fibers.

16. The fusion splicer according to claim 1, wherein each clamp of the plurality of clamps includes a first part to which one end of the shaft portion is connected, a second part to which the other end of the shaft portion is connected, and a pressing portion connecting the first part and the second part to each other.

17. The fusion splicer according to claim 16, wherein each of the first part, the second part, and the pressing portion has a block shape.

18. The fusion splicer according to claim 16, wherein the pressing portion extends below the shaft portion along the direction in which the optical fibers extend.

* * * * *